(12) United States Patent
Sorlie et al.

(10) Patent No.: US 12,559,051 B2
(45) Date of Patent: Feb. 24, 2026

(54) BUMPER ARRANGEMENT WITH END EXTENSION

(71) Applicant: BENTELER AUTOMOBILTECHNIK GMBH, Paderborn (DE)

(72) Inventors: Havard Sorlie, Lillehammer (NO); Odd Perry Sovik, Kolbu (NO)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 384 days.

(21) Appl. No.: 18/234,090

(22) Filed: Aug. 15, 2023

(65) Prior Publication Data

US 2024/0059236 A1 Feb. 22, 2024

(30) Foreign Application Priority Data

Aug. 16, 2022 (DE) ..................... 10 2022 120 617.3

(51) Int. Cl.
| | |
|---|---|
| *B60R 19/04* | (2006.01) |
| *B60R 19/12* | (2006.01) |
| *B60R 19/18* | (2006.01) |
| *B60R 19/24* | (2006.01) |
| *B60R 19/34* | (2006.01) |

(52) U.S. Cl.
CPC .............. *B60R 19/04* (2013.01); *B60R 19/12* (2013.01); *B60R 19/18* (2013.01); *B60R 19/34* (2013.01); *B60R 2019/1806* (2013.01); *B60R 2019/182* (2013.01); *B60R 2019/247* (2013.01)

(58) Field of Classification Search
CPC ....... B60R 19/023; B60R 19/04; B60R 19/08; B60R 19/12; B60R 2019/182; B60R 2019/1813; B60R 2019/247

USPC ................ 293/143, 144, 146, 149, 152, 154
See application file for complete search history.

(56) References Cited

U.S. PATENT DOCUMENTS

| | | | | |
|---|---|---|---|---|
| 8,505,990 B2* | 8/2013 | Czopek | ................... | B60R 19/18 293/133 |
| 10,486,745 B1* | 11/2019 | Kim | ......................... | B60R 19/18 |
| 12,065,093 B2* | 8/2024 | Orzelek | .................. | B60R 19/18 |
| 12,409,800 B2* | 9/2025 | Berger | .................... | B60R 19/18 |

(Continued)

FOREIGN PATENT DOCUMENTS

| | | |
|---|---|---|
| DE | 102017124590 A1 | 4/2019 |
| DE | 202021103263 U1 | 6/2021 |

OTHER PUBLICATIONS

Office Action for German Application No. 10 2022 120 617.3 mailed Mar. 31, 2023; 14pp.

*Primary Examiner* — Gregory A Blankenship
(74) *Attorney, Agent, or Firm* — HAUPTMAN HAM, LLP

(57) ABSTRACT

A bumper arrangement, is coupled to a motor vehicle via crash boxes, having a main crossmember and an auxiliary crossmember which is below the main crossmember in the vertical direction of the motor vehicle, wherein the main crossmember and the auxiliary crossmember are connected to one another in their end region, wherein a connecting part is in the form of an extruded profile which in lengthwise portions extends with an orientation in the transverse direction Y of the motor vehicle as extension of the main crossmember and/or the auxiliary crossmember and in lengthwise portions is oriented in the vertical direction Z of the motor vehicle by way of a bending operation.

17 Claims, 6 Drawing Sheets

(56)　　　　　　References Cited

U.S. PATENT DOCUMENTS

| | | | | |
|---|---|---|---|---|
| 2011/0221213 | A1* | 9/2011 | Riviere | B62D 25/084 |
| | | | | 293/132 |
| 2015/0076847 | A1* | 3/2015 | Mori | B62D 21/152 |
| | | | | 293/154 |
| 2016/0144813 | A1* | 5/2016 | Clauser | B60R 19/24 |
| | | | | 293/133 |
| 2017/0144619 | A1* | 5/2017 | Shamoto | B60R 19/48 |
| 2020/0231107 | A1* | 7/2020 | Günther | B60R 19/18 |
| 2022/0153215 | A1* | 5/2022 | Paare | B60R 19/12 |
| 2022/0242347 | A1* | 8/2022 | Berger | B60R 19/03 |
| 2022/0242348 | A1* | 8/2022 | Orzelek | B60R 19/18 |
| 2022/0242349 | A1* | 8/2022 | Berger | B60R 19/18 |
| 2022/0258684 | A1* | 8/2022 | Günther | B60R 19/12 |
| 2023/0047814 | A1* | 2/2023 | Mueller | B60R 19/12 |
| 2023/0219514 | A1* | 7/2023 | Wiedemann | B60R 19/26 |
| | | | | 293/132 |
| 2024/0059236 | A1* | 2/2024 | Sorlie | B60R 19/34 |

* cited by examiner

BUMPER ARRANGEMENT WITH END EXTENSION

RELATED APPLICATIONS

The present application claims priority to German Application Number 10 2022 120 617.3 filed Aug. 16, 2022, the disclosure of which is hereby incorporated by reference herein in its entirety.

FIELD

The present disclosure relates to a bumper arrangement.

BACKGROUND

Motor vehicles have bumper arrangements at the front and the end. In the event of a vehicle crash or a collision or even an impact against an object, such a bumper arrangement performs two tasks. Firstly, a crossmember is present. The crossmember is rigid enough to prevent a corresponding object or motor vehicle from penetrating too far into the front or end region. Therefore, a possibly punctiform impact, for example against a post, is transmitted by the crossmember to a large portion of the width of the motor vehicle.

A second task performed by a bumper arrangement is to convert crash energy into deformation work and thereby correspondingly reduce the impact energy. To this end, a respective crossmember is coupled to the motor vehicle via crash boxes. For this, the crash boxes are arranged between a center region and an end region of the crossmember, in relation to the transverse direction of the motor vehicle, and therefore are each arranged between one third and one quarter of the length in the outer region of the crossmember, in relation to the width of the motor vehicle. The crash boxes are then usually coupled to longitudinal members of the motor vehicle. In the event of an impact, the crash boxes fold, for example in the manner of a concertina, and thus convert crash energy into deformation work.

SUMMARY

An object of the present disclosure is to provide a bumper arrangement which is able to be adapted individually to various vehicle types and at the same time meets current crash requirements, such as the MPDB test.

The aforementioned object is achieved according to the disclosure by a bumper arrangement, which is coupled to a vehicle via crash boxes.

The bumper arrangement is coupled to a motor vehicle with respect to the crash box. The bumper arrangement includes a main crossmember and an auxiliary crossmember, which is arranged above or below the main crossmember in the vertical direction of the motor vehicle. The main crossmember and the auxiliary crossmember are connected to one another in their respective end region. Within the context of the disclosure, the main crossmember is able to be supported on the motor vehicle via crash boxes and for the auxiliary crossmember to be supported on the motor vehicle via crash boxes. The main crossmember and the auxiliary crossmember are also able to be supported on the motor vehicle together via crash boxes. The main crossmember and the auxiliary crossmember likewise is able to be coupled to one another via vertical struts.

According to at least one embodiment of the disclosure, the bumper arrangement is now distinguished in that a connecting part is in the form of an extruded profile. The extruded profile extends firstly in lengthwise portions in the transverse direction of the motor vehicle as extension of the main crossmember and/or auxiliary crossmember. Both the main crossmember and the auxiliary crossmember, or only the main crossmember or only the auxiliary crossmember, are able to be arranged with an extension oriented in the transverse direction of the motor vehicle owing to the connecting part. The connecting part also is able to be itself a curvature or be arranged at a curved end of the main crossmember or the auxiliary crossmember, with the result that the connecting part is also able to some extent extends with an orientation in the longitudinal direction of the motor vehicle. The main orientation is, however, provided in the transverse direction of the motor vehicle for this longitudinal portion.

According to at least one embodiment of the disclosure, the respective connecting part is able to be formed in one piece and made of one and the same material, in the form of an extruded component. Therefore, the connecting component is produced in the form of a separate third component and is then according to the disclosure coupled to the main crossmember and the auxiliary crossmember. Owing to a bending operation, the connecting part thus also extends with an orientation in the vertical direction of the motor vehicle in lengthwise portions and thereby connects the main crossmember and the auxiliary crossmember in the vertical direction of the motor vehicle in the end region.

By virtue of the arrangement according to the disclosure of the connecting part, the overall width of the bumper arrangement is able to be set by correspondingly selecting the connecting part in lengthwise portions. The same main crossmember and auxiliary crossmember are able to have a wider or narrower form in absolute terms owing to different connecting parts. The bumper arrangement is able to be adapted to various vehicle models.

Owing to the vertically oriented longitudinal portion which is located in front of a wheel that is behind in the longitudinal portion in the longitudinal direction of the motor vehicle, an additional load path is able to be generated in the event of an offset crash or MPDB crash. In the process, the vertically oriented portion of the connecting part impacts against the wheel located behind and the connecting part and is supported against this wheel. In the event of a crash of higher intensity, the wheel is pressed to a great extent against a sill located behind in the connecting part in the longitudinal direction of the motor vehicle, with the result that an additional load path is produced not only via the original longitudinal member of the motor vehicle but also via the wheel or the sill. The passenger compartment is thus effectively protected against deformations or penetration into the passenger compartment.

From a manufacturing technology perspective, since, by individually adapting the connecting part in the form of an extruded component, which is subsequently formed, the width is able to be individually defined and the height offset of the main crossmember and the auxiliary crossmember also is able to be individually defined, this is able to be set respectively by way of a correspondingly easy bending operation of the connecting part.

The connecting part itself is in the form of a single-chamber hollow profile. The connecting part is also able to in lengthwise portions be in the form of a two-chamber hollow profile or even a multiple-chamber hollow profile. The connecting part is firstly extruded in the form of a two-chamber hollow profile and then cut out respectively in pairs mirror-symmetrically from a longitudinal portion of the extrusion profile. Therefore, the two-chamber hollow profile portion is able to be in the form of an extension of the cross-sectionally larger bumper, for example of the main crossmember, and then, with a bend away therefrom, follow the vertical portion and, with a bend away in turn, a portion of the auxiliary crossmember is able to be bent out. Overall, the connecting part would thus have a U-shaped form in a front view. An opening in the U then faces the center of the motor vehicle. A valley region of the U faces the outer side of the motor vehicle in a front view of the bumper arrangement.

The lateral extension of a connecting part, in the transverse direction of the motor vehicle, of the main crossmember and/or auxiliary crossmember is at least 5%, more than 10%, of the length of the main crossmember and/or auxiliary crossmember.

The lateral extension should however not exceed 50%, more than 35% and 25% of the length of the main crossmember and/or auxiliary crossmember. Therefore, up to one quarter of the overall length in the transverse direction of the vehicle on each side of the bumper arrangement is able to be made up by the lateral extension resulting from the connecting parts.

In order to be able to produce and also mount the bumper arrangement according to the disclosure from cost-saving fashion, the connecting part able to be plugged onto and/or into the main crossmember and/or the auxiliary crossmember is advantageous. The main crossmember and/or the auxiliary crossmember are themselves in the form of a hollow chamber profile, and for example also be in the form of a sheet-metal shaped component or a top-hat profile with a closing panel. The main crossmember and the auxiliary crossmember are able to, however, themselves be produced as an extruded component. The connecting part is then plugged into the main crossmember in lengthwise portions. The connecting part is also plugged onto the auxiliary crossmember. A respective reverse arrangement is also possible.

In the case of an extruded component with multiple hollow chambers and partition wall dividing the chambers (multiple-chamber hollow profile) as main crossmember, the connecting part is able to be plugged in in such a way that the partition wall or inner walls are cut out or slotted in the insertion length. The same also is able to apply alternatively to the connecting part itself when the latter is plugged onto one of the crossmembers and has inner walls between multiple hollow chambers.

In order to provide high flexural rigidity in the event of an accident, such as the plugging-on or plugging-in longitudinal portion has more than 2%, more than 4%, of the length of the main crossmember and/or auxiliary crossmember.

When additional coupling takes place, for example, an integrally bonded joining operation is able to be advantageous. The additional coupling takes place on the front side of the bumper arrangement. Here, a tensile chord to be produced on the front side in the event of various crash scenarios is able to be advantageous. A high rigidity of the bumper arrangement according to the disclosure is provided. As an alternative or in addition, use also is able to be made, for example, of a coupling by means of riveting processes.

In at least one embodiment of the disclosure, the connecting part is able to run toward the outside end region of the bumper arrangement, then continue, with a bend away, in the longitudinal direction of the motor vehicle rearwardly to a wheel arranged behind it. The rear side, which faces the wheel, of the connecting part, such as the vertical portion of the connecting part, is flattened. In the event of impact against a wheel, owing to the flattening, already at the curved connecting part an impact of an edge against the rubber of the wheel and the possibility of the wheel rupturing or bursting as a result is thus avoided.

In at least one embodiment of the disclosure, the main crossmember and the auxiliary crossmember are able to be formed in one piece and be made of one and the same material. For example, this is able to be produced first of all by an extruded component. A flange, which connects the main crossmember and the auxiliary crossmember and is formed in one piece and made of one and the same material is then at least in lengthwise portions cut out at later installation locations in the transverse direction of the motor vehicle, resulting in the presence of vertical connecting struts, however the main crossmember and the auxiliary crossmember are formed in one piece and made of one and the same material.

In at least one embodiment of the disclosure, the connecting part itself in cross section is provided with a rectangular, such as a square profile cross section. An overall bend radius between the horizontal longitudinal portion and the vertical longitudinal portion then corresponds to 1 to 5 times, to 1.5 to 3 times, the height of the chamber or a chamber of the connecting part. During the production operation of the connecting part, buckling or kinking during the bending operation is thus reliably avoided. In the event of a crash, the connecting part thus has a flexurally rigid geometry without the risk of uncontrolled buckling.

The connecting part is bent twice, each time by approximately 90°. The vertical portion has been shown to be advantageous in this respect. The vertical portion has a larger form with the result that, in the event of a crash, the surface area impacting against a wheel that is behind is the vertical portion is correspondingly large. The connecting part however is able to also be U-shaped or V-shaped, that is to say bent by 180°, in order to connect the main crossmember and the auxiliary crossmember to one another. This applies all the more in the case of a smaller overall bend radius, as described above.

BRIEF DESCRIPTION OF THE DRAWINGS

The following description relates to further advantages, features, properties and aspects of the disclosure. The figures depict exemplary embodiments to illustrate the concept of the disclosure. In the figures.

DETAILED DESCRIPTION

In the figures, the same reference signs are used for the same or similar components, albeit a repeated description is omitted for reasons of simplification.

Figure 1:
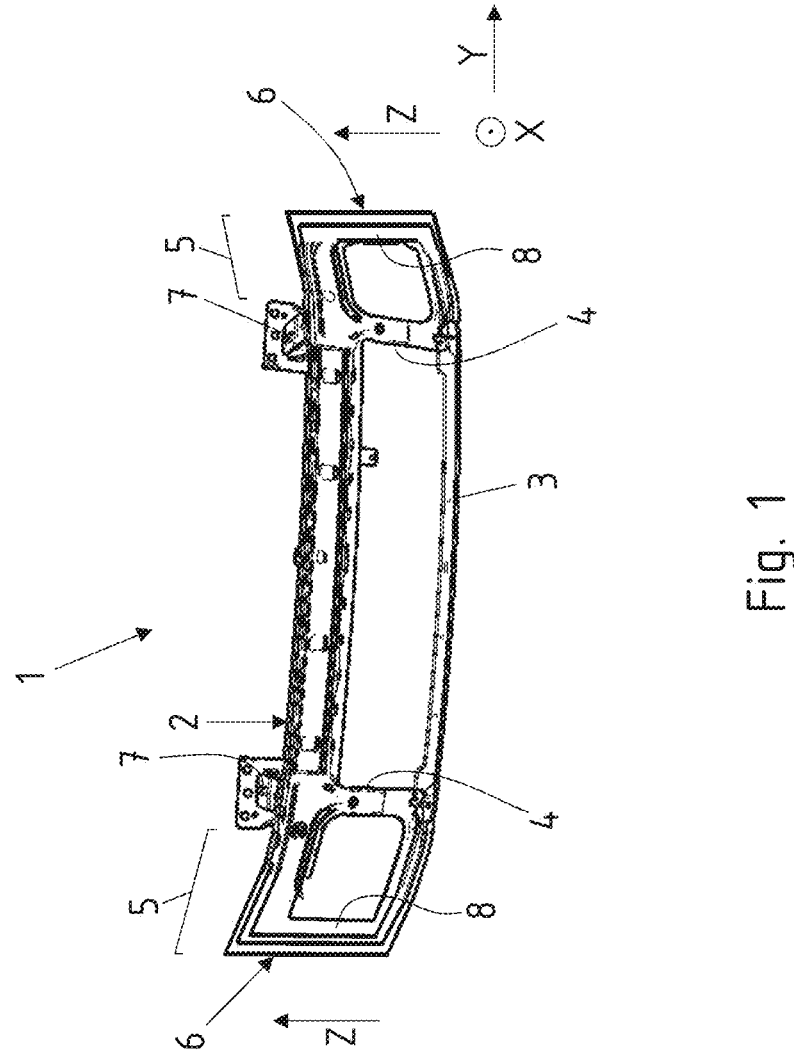
FIG. 1 shows a bumper arrangement according to at least one embodiment of the disclosure.

FIG. 1 shows a bumper arrangement 1 according to the disclosure, having a main crossmember 2 arranged at the top and an auxiliary crossmember 3 arranged below it in the vertical direction 7 of the motor vehicle. The main cross-member 2 and the auxiliary crossmember 3 are connected to one another via vertical struts 4. The main crossmember 2 and the auxiliary crossmember 3 are coupled to one another via a respective connecting part 6 in the respective end regions 5. The main crossmember 2 is also fixed to a motor vehicle, not illustrated in more detail, or to longitudinal members of the motor vehicle via crash boxes 7. The respective connecting part 6 connects the main crossmember 2 and the auxiliary crossmember 3 in the vertical direction of the motor vehicle. The connecting part 6 also extends the main crossmember 2 and the auxiliary crossmember 3 in the transverse direction Y of the motor vehicle, with the result that they in turn protrude laterally beyond the crash boxes 7 by way of their end regions 5. A vertical portion, which is oriented in the vertical direction of the motor vehicle, is arranged in front of a wheel 11, not illustrated in more detail, in the longitudinal direction X of the motor vehicle.

Figures 2A, 2B, 2C, 2D:
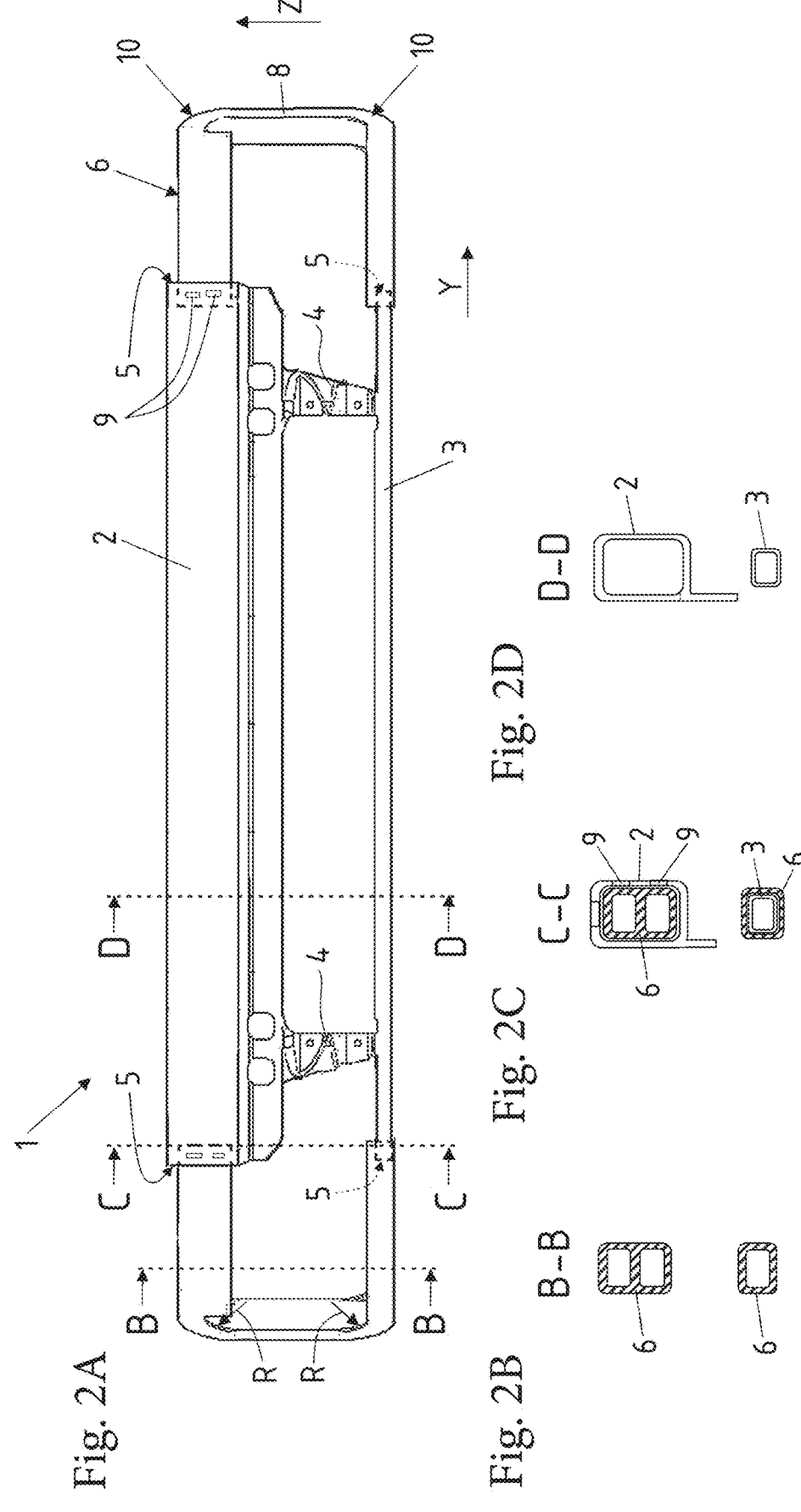
FIG. 2A shows a front view of a bumper arrangement according to at least one embodiment of the disclosure.
FIG. 2B-FIG. 2D show cross-sectional views along the sectional lines B-B, C-C and D-D of FIG. 2A.

FIG. 2A shows a front view of a bumper arrangement 1 according to the disclosure. The upper main crossmember 2, such as in the vertical direction Z of the motor vehicle, is considerably larger than the auxiliary crossmember 3 arranged below it. The main crossmember 2 and the auxiliary crossmember 3 are connected to one another via additional vertical struts 4. An upper part of the connecting part 6 is plugged in laterally in the end region 5 of the main crossmember 2. Therefore, the main crossmember 2 has an extension in the transverse direction Y of the motor vehicle. The connecting part 6 is then positionally fixed in the main crossmember 2 via for example two plug welds 9. The connecting part 6 has two bends 10 each with a bend radius R and is formed in one piece and made of one and the same material. The connecting part 6, running in a vertical part 8 in the vertical direction of the motor vehicle and in a lower region in turn in a transverse direction Y of the motor vehicle, is then plugged onto the lower auxiliary crossmember 3, such as an end region 5 of the lower auxiliary crossmember 3. An additional integrally bonded coupling is able to take place here, too.

The cross sections or outer contours, respectively matched to the main crossmember 2 and the auxiliary crossmember 3, of the connecting part 6 are for load transfer and stability. An integrally bonded connection or addition-ally a force-fitting connection with one or both crossmem-bers 2, 3 is also able to be formed.

FIG. 2B-FIG. 2D show various cross-sectional views along the sectional lines B-B, C-C and D-D of FIG. 2A. According to FIG. 2B, the connecting part 6 is in the form of a double-chamber hollow profile in an upper region and a single-chamber hollow profile in a lower region. Accord-ing to the sectional line of FIG. 2C, the connecting part 6 is plugged into the main crossmember 2, and substantially corresponds to the outer cross-sectional profile of the con-necting part 6, such as here the two-chamber hollow profile corresponds to the inner cross-sectional profile of the main crossmember 2 in the end region 5. The connecting part 6 is also plugged onto the auxiliary crossmember 3 in the lower region. Here, the inner cross-sectional profile of the con-necting part 6 corresponds to the outer cross-sectional profile of the auxiliary crossmember 3.

FIG. 2D shows the main crossmember 2 and the auxiliary crossmember 3 along the sectional line D-D of FIG. 2A. The main crossmember 2 is able to have a flange 17 which protrudes with a downward orientation. The latter is able to serve as additional fastening option for example for the vertical struts 4, provided that the flange 17 is not formed in one piece with and made of one and the same material as the auxiliary crossmember 3. The main crossmember 2 and the auxiliary crossmember 3 are arranged substantially on one level in the longitudinal direction X of the motor vehicle according to FIG. 2D. The main crossmember 2 and the auxiliary crossmember 3 are also able to be offset in the longitudinal direction X of the motor vehicle.

Figure 3:
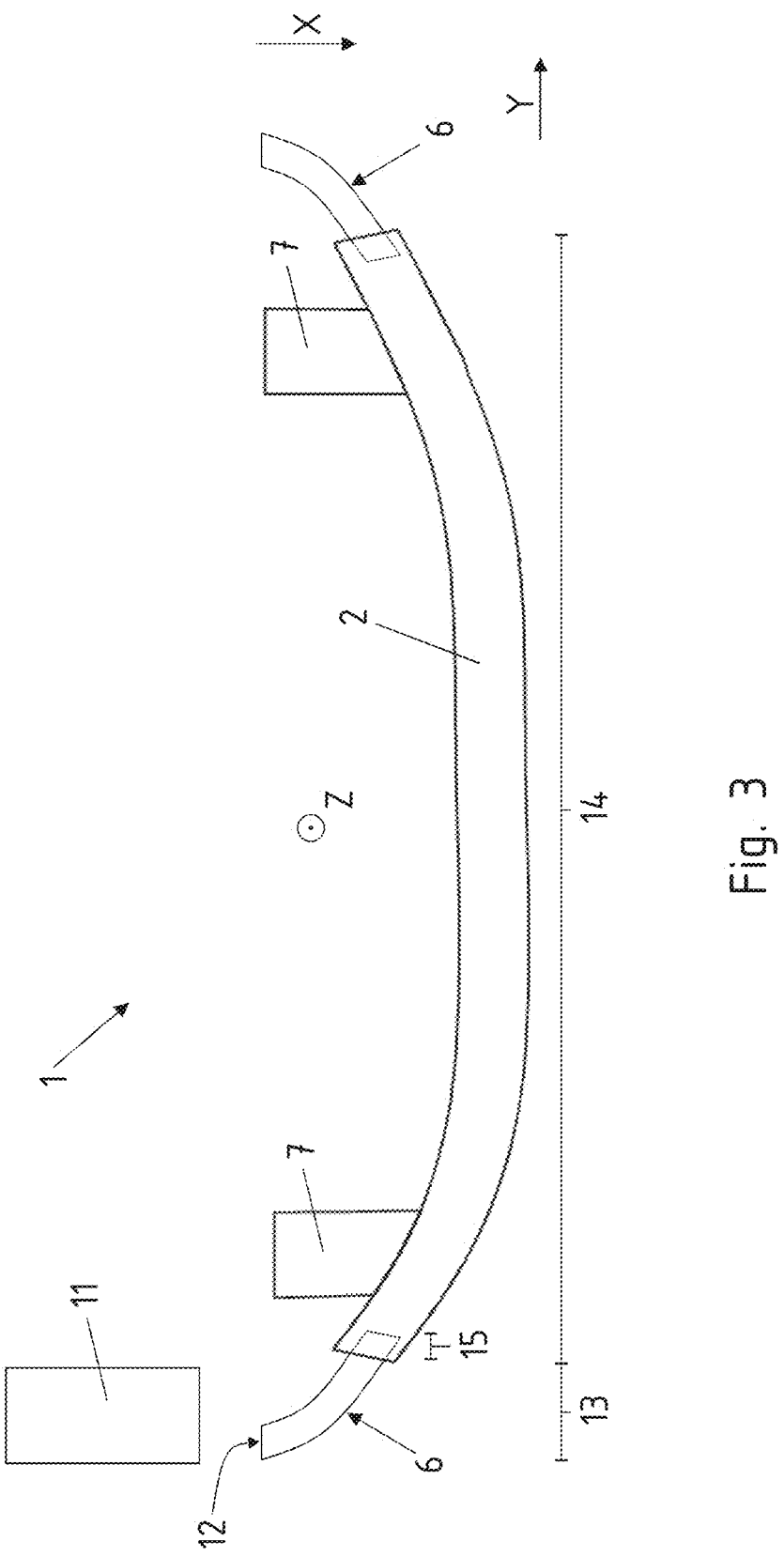
FIG. 3 shows a plan view of a bumper arrangement according to at least one embodiment of the disclosure.

FIG. 3 shows a plan view of a bumper arrangement 1 according to the at least one embodiment of the disclosure. The main crossmember 2 has a curvature about the vertical direction of the motor vehicle. The connecting parts 6 thus extend the crossmembers, or the bumper arrangement 1, not just in the vertical direction of the motor vehicle. Rather, the connecting parts 6 are also curved or bent away in the longitudinal direction X of the motor vehicle. The connect-ing parts 6 are thus arranged with an orientation toward a wheel 11 which is behind them in the longitudinal direction X of the motor vehicle. In the event of a frontal crash, the connecting part 6 thus presses in the direction of the wheel 11, comes into contact here and provides an additional load path in the event of a crash. To this end, a rear side 12 of the connecting part 6 is able to have a flattened form in front of the wheel 11, as illustrated here, and/or have a widened shape. Therefore, no corners or sharp edges penetrate the wheel 11. The length 13 by way of which the connecting part 6 protrudes laterally beyond the main crossmember 2 is greater than 5% of the length 14 of the main crossmember 2. The length 15 by way of which the connecting part 6 is plugged into the main crossmember 2 is also larger than 2% of the length 14 of the main crossmember 2.

Figures 4A, 4B:
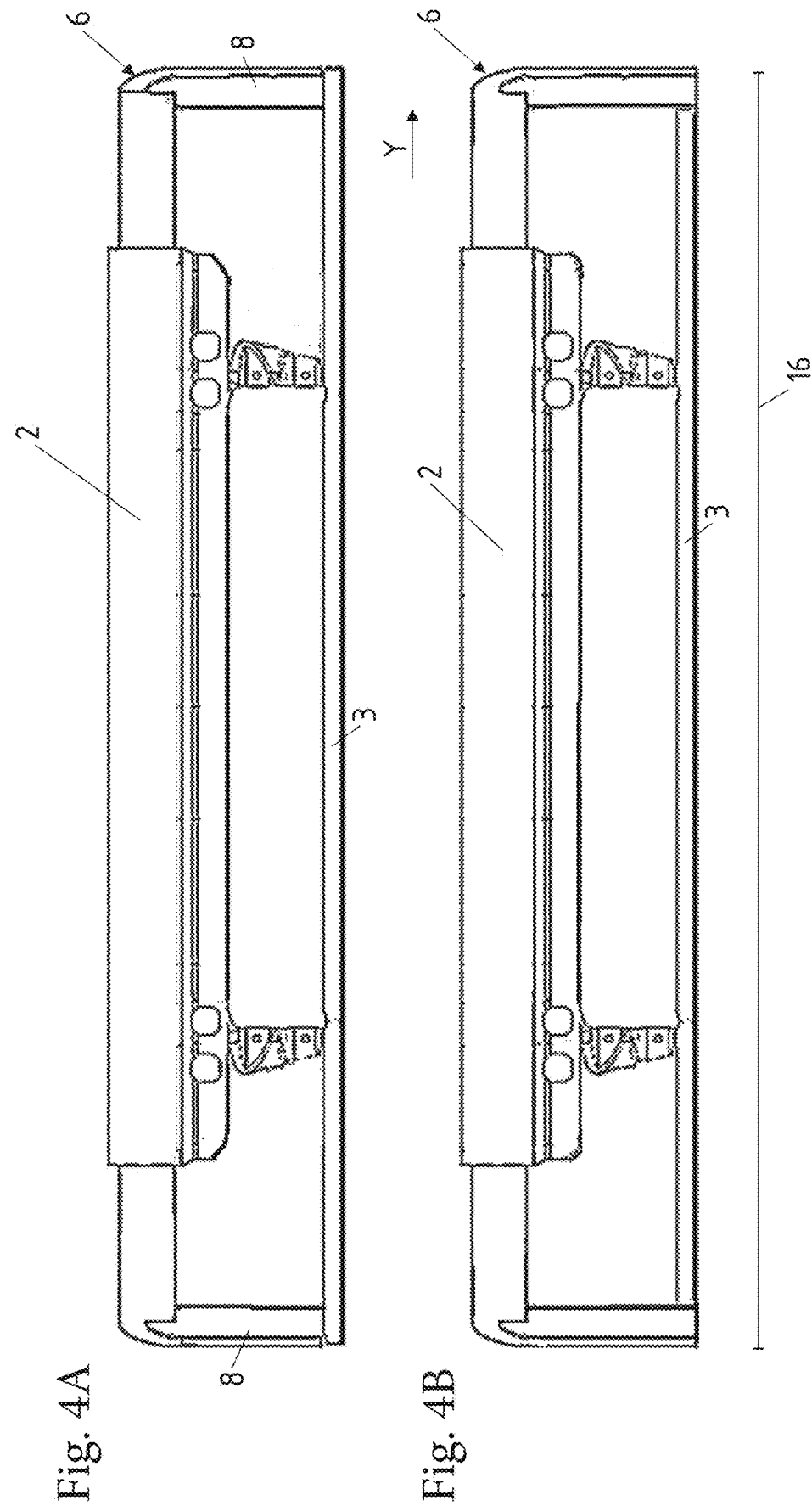
FIG. 4A-FIG. 4B show modifications to FIG. 2A-FIG. 2D, FIG. 5A and FIG. 5B show modifications to FIG. 2A-FIG. 2D.

FIG. 4A and FIG. 4B show modifications to FIG. 2A-FIG. 2D. In this case, the main crossmember 2 is laterally extended by the connecting part 6. The auxiliary crossmem-ber 3 is however not laterally extended by the connecting part 6. The auxiliary crossmember 3 extends completely (FIG. 4a) or virtually (FIG. 4b) over the entire width or length of the bumper arrangement 1. According to the embodiment variant of FIG. 4A, the vertical part of the connecting part 6 is upright on the auxiliary crossmember 3 and is coupled thereto from the top. According to the embodiment variant of FIG. 4B, the vertical part of the connecting part 6 engages over the auxiliary crossmember 3 and is coupled thereto at the end. The auxiliary crossmember 3 is in this case however not extended laterally by the connecting part 6.

Figures 5A, 5B:
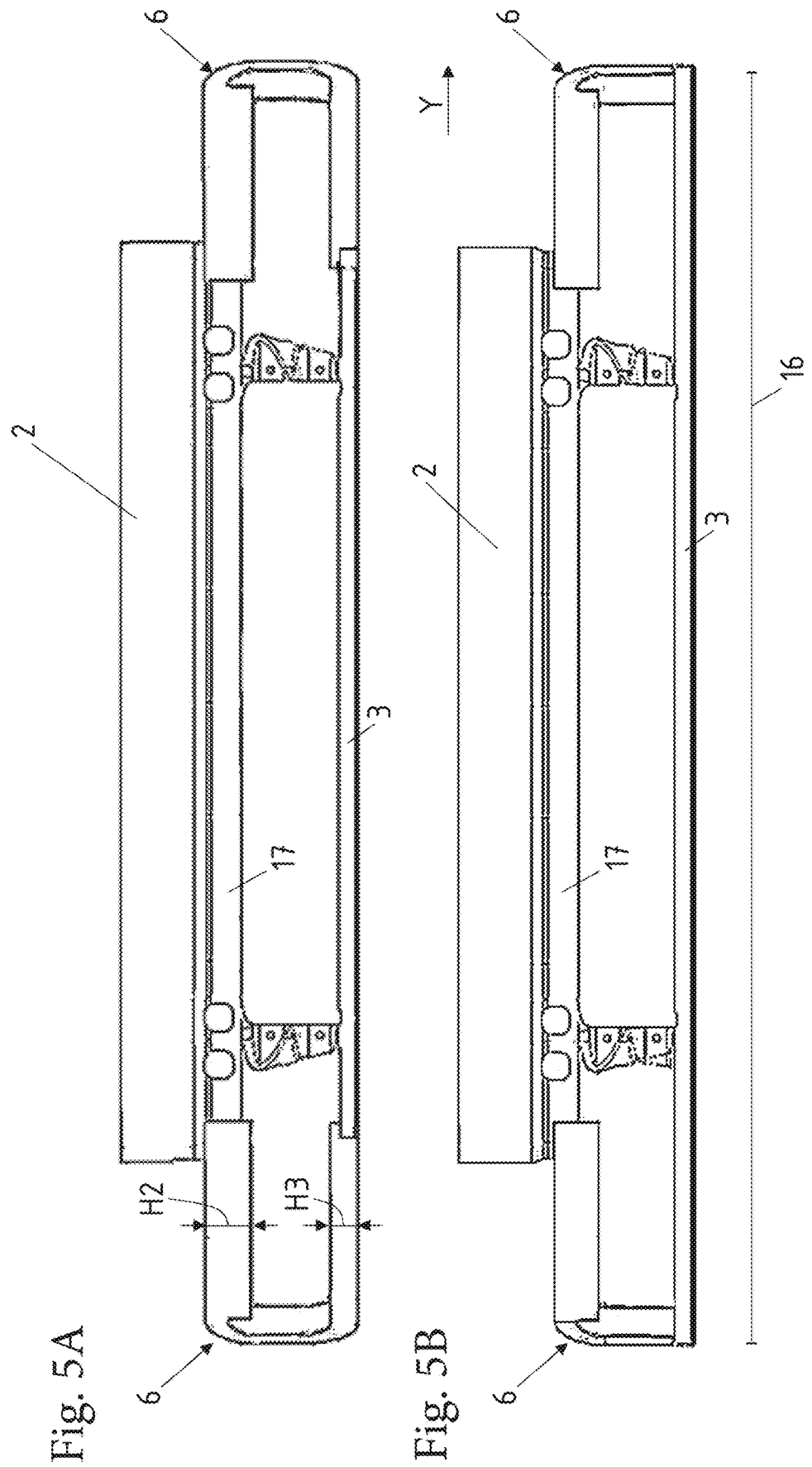

FIG. 5A and FIG. 5B show a modification. In this case, the main crossmember 2 by way of its downwardly protrud-ing flange 17 is laterally extended by the connecting part 6. In this case, the connecting part 6 is coupled to the flange 17, such as by welding or screwing. A lower part of the connecting part 6 is laterally plugged onto the auxiliary crossmember 3. In the case of the embodiment variant of FIG. 5A, the auxiliary crossmember 3 this likewise extends through the connecting part 6 with an orientation in the transverse direction Y of the motor vehicle. In the case of FIG. 5B, the connecting part 6 is likewise coupled to the downwardly protruding flange 17 of the main crossmember 2. The auxiliary crossmember 3, however, extends over the entire width or length 16 of the bumper arrangement 11 in the transverse direction Y of the motor vehicle. In FIG. 5A the height H2 in the region of the main crossmember 2 is larger than, or twice as high as, the height H3 of the connecting part 6 in the region of the auxiliary crossmember 3. For example, the connecting part 6 is able to be produced in the form of a double-chamber hollow profile by extrusion.

After the extrusion operation and before the bending operation, a chamber is machined by cutting in the region of the smaller height H3. Two connecting parts 6 are able to be produced at the same time in the form of a double-chamber hollow profile in each case and to separate them by a separating process.

Figure 6:
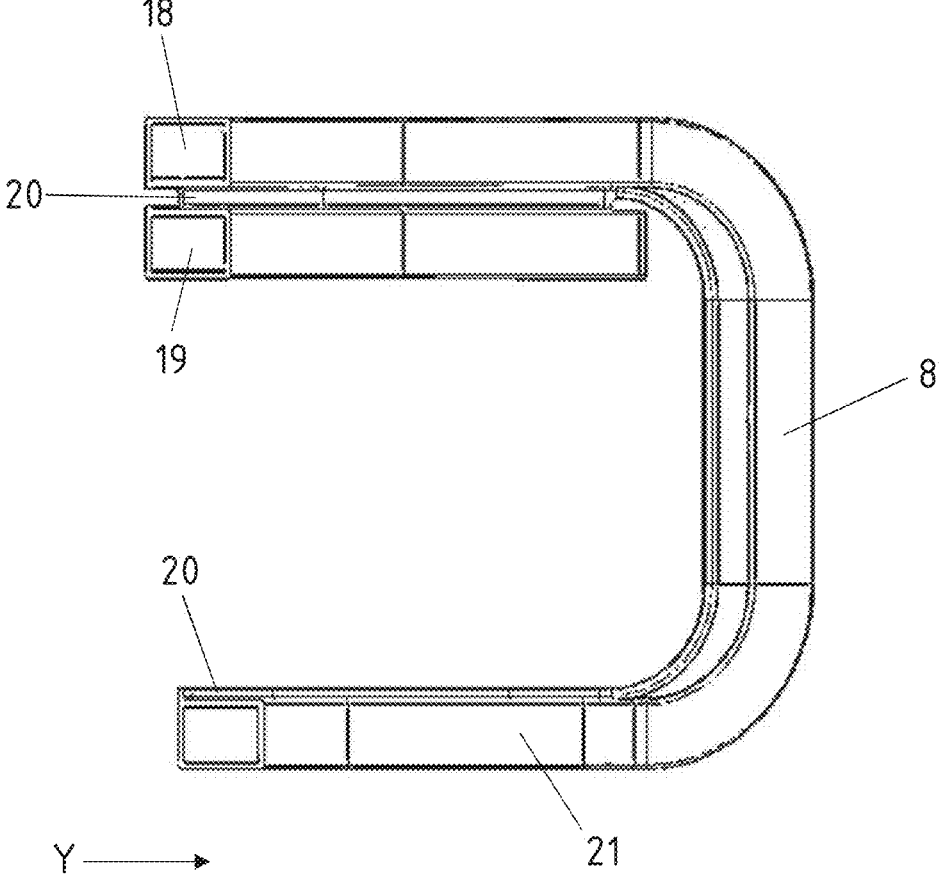
FIG. 6 shows an exemplary embodiment of a connecting part for a bumper arrangement according to at least one embodiment of the disclosure.

FIG. 6 shows a perspective view of a connecting part 6. The connecting part 6 is in the form of a two-chamber hollow profile. Between an upper chamber 18 and a lower chamber 19 there is formed a connecting web 20 which connects these two chambers. The connecting web 20 is able to be severed in lengthwise portions, with the result that the vertical part and extension, aligned in the transverse direction Y of the motor vehicle, of the auxiliary crossmember 21 are each in the form of a one-chamber hollow profile. The connecting web is still partially present but also is able to be completely cut away by separation technology. In this embodiment variant, the possibility of plugging the upper part into the main crossmember 2 and plugging the lower part onto the auxiliary crossmember 3 is provided.

The foregoing description of some embodiments of the disclosure has been presented for purposes of illustration and description. The description is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. Various changes, substitutions and alterations can be made hereto without departing from the spirit and scope of the disclosure.

The invention claimed is:

1. A bumper arrangement, which is coupled to a motor vehicle via crash boxes, the bumper arrangement comprising:
   a main crossmember; and
   an auxiliary crossmember which is above or below the main crossmember in a vertical direction of the motor vehicle, wherein
   each of the main crossmember and the auxiliary crossmember has corresponding end regions, the main crossmember and the auxiliary crossmember are connected to one another via the corresponding end regions, and
   a connecting part is configured as an extruded profile which in lengthwise portions extends with an orientation in a transverse direction of the motor vehicle as an extension of at least one of the main crossmember or the auxiliary crossmember, and in the lengthwise portions is oriented in a vertical direction of the motor vehicle via at least one bend in the connecting part.

2. The bumper arrangement according to claim 1, wherein the connecting part comprises one piece made of a same material.

3. The bumper arrangement according to claim 1, wherein the connecting part comprises a single-chamber hollow profile in a region of the at least one bend.

4. The bumper arrangement according to claim 1, wherein the connecting part in the lengthwise portions is configured as a two-chamber hollow profile in a non-bent region of the connection part.

5. The bumper arrangement according to claim 1, wherein the connecting part extend both the main crossmember and the auxiliary crossmember in the transverse direction of the motor vehicle.

6. The bumper arrangement according to claim 1, wherein a lateral extension of the connecting part, in the transverse direction of the motor vehicle, corresponds to at least 5% of a length of the at least one of the main crossmember or the auxiliary crossmember.

7. The bumper arrangement according to claim 1, wherein at least one of the main crossmember or the auxiliary crossmember is configured as a hollow-chamber profile in a cross section of the crossmember.

8. The bumper arrangement according to claim 1, wherein the connecting part laterally, at least in the lengthwise portions, is plugged into or onto the at least one of the main crossmember or the auxiliary crossmember by more than 2% of a length of the at least one of the main crossmember or the auxiliary crossmember.

9. The bumper arrangement according to claim 1, wherein the connecting part is additionally coupled to the at least one of the main crossmember or the auxiliary crossmember by an integral bond.

10. The bumper arrangement according to claim 1, wherein the connecting part is bent away in relation to a wheel arranged behind the bumper arrangement.

11. The bumper arrangement according to claim 1, wherein a rear side of the connecting part which faces a wheel is at least one of being flattened or being widened.

12. The bumper arrangement according to claim 1, wherein the at least one bend has a bend radius which corresponds to 1 to 5 times of a height of a chamber of the connecting part.

13. The bumper arrangement according to claim 1, wherein the main crossmember and the auxiliary crossmember are configured in one piece and made of a same material.

14. The bumper arrangement according to claim 1, wherein a lateral extension of the connecting part, in the transverse direction of the motor vehicle, corresponds to more than 10% of a length of the at least one of the main crossmember or the auxiliary crossmember.

15. The bumper arrangement according to claim 1, wherein the connecting part laterally, at least in the lengthwise portions, is plugged into or onto the at least one of the main crossmember or the auxiliary crossmember by more than 4% of a length of the at least one of the main crossmember or the auxiliary crossmember.

16. The bumper arrangement according to claim 1, wherein the at least one bend has a bend radius which corresponds to 1.5 to 3 times a height of a chamber of the connecting part.

17. The bumper arrangement according to claim 1, wherein the main crossmember and the auxiliary crossmember are connected to one another via at least two flanges protruding from the main cross member.

* * * * *